US006290917B1

United States Patent
Yamamoto

(10) Patent No.: US 6,290,917 B1
(45) Date of Patent: Sep. 18, 2001

(54) AERATING APPARATUS WITH FAR INFRARED RADIATION

(75) Inventor: Takashi Yamamoto, Minoo (JP)

(73) Assignee: Shunji Une, Torrance, CA (US)

( * ) Notice: Subject to any disclaimer, the term of this patent is extended or adjusted under 35 U.S.C. 154(b) by 0 days.

(21) Appl. No.: 09/184,167

(22) Filed: Nov. 2, 1998

(30) Foreign Application Priority Data

Feb. 9, 1998 (JP) ................................ 10-042816

(51) Int. Cl.⁷ .......................... C02F 7/00; C02F 1/30
(52) U.S. Cl. ................. 422/159; 422/184.1; 261/76; 261/DIG. 75
(58) Field of Search ................... 422/159, 184.1, 422/22; 261/76, DIG. 75, 78.1; 210/198.1, 221.2; 366/165.1, 163.2

(56) References Cited

U.S. PATENT DOCUMENTS

| | | | |
|---|---|---|---|
| 1,152,302 | * | 8/1915 | Davenport . |
| 1,747,687 | * | 2/1930 | Wheeler .................................. 261/75 |
| 2,307,509 | * | 1/1943 | Joachim et al. ................... 366/178.2 |
| 4,123,800 | * | 10/1978 | Mazzei .................................. 366/150 |
| 4,743,405 | * | 5/1988 | Durao et al. ............................ 261/76 |
| 4,761,077 | * | 8/1988 | Werner .................................. 366/165 |
| 4,954,147 | * | 9/1990 | Galgon .................................... 95/263 |
| 4,992,216 | * | 2/1991 | Saita et al. ............................. 261/122 |
| 5,004,484 | * | 4/1991 | Stirling et al. .......................... 95/263 |
| 5,055,189 | * | 10/1991 | Ito ........................................ 210/222 |
| 5,298,198 | * | 3/1994 | LaCrosse ................................ 261/76 |
| 5,496,505 | * | 3/1996 | Walla et al. ............................ 261/76 |
| 5,635,059 | * | 6/1997 | Johnson ................................ 210/192 |
| 5,714,119 | * | 2/1998 | Kawagoe et al. ....................... 422/21 |
| 6,042,340 | * | 3/2000 | Melbourne ............................ 417/151 |

* cited by examiner

*Primary Examiner*—Marian C. Knode
*Assistant Examiner*—Susan Ohorodnik
(74) *Attorney, Agent, or Firm*—Irving Keschner

(57) ABSTRACT

Apparatus for sewage purifying treatment having a suction nozzle member for supplying pressurized water, an intermediate nozzle member and an injection nozzle member, each having a water passage therein, each nozzle being connected to each other. An air introducing nozzle is formed between nozzle members. An outer casing is arranged in such a fashion that an air introducing chamber is formed at the outer circumference of the intermediate nozzle member, the air introducing chamber and the air introducing nozzle communicating with each other. A pressurized water supply pipe is connected to an end of the suction nozzle member and an air supply pipe is connected to the outer casing for supplying the air to the outer casing. A groove for micronizing coarse bubbles are formed at the downstream position of the air introducing nozzles.

1 Claim, 2 Drawing Sheets

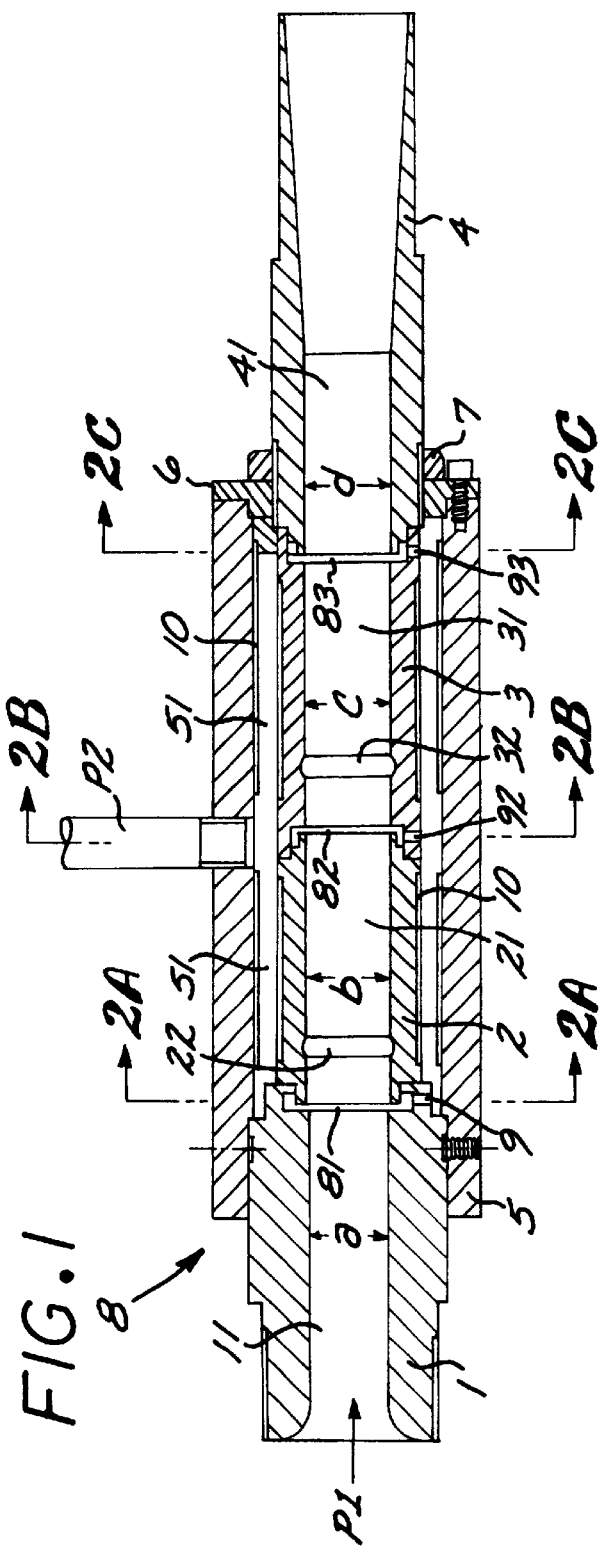
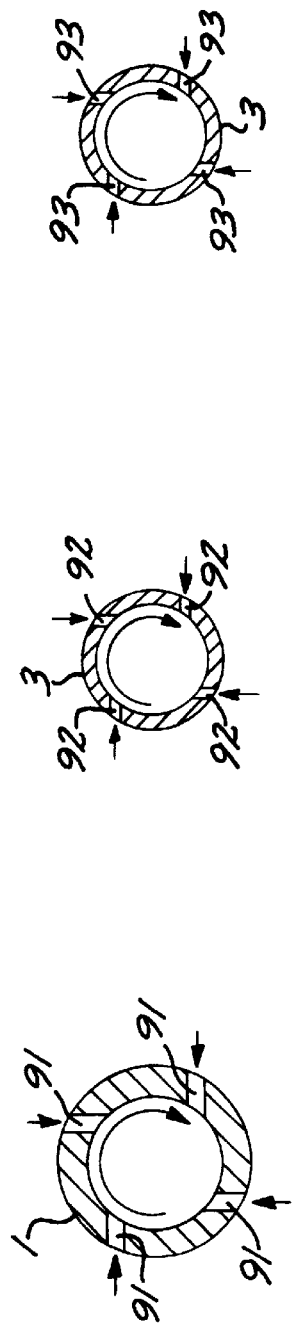

AERATING APPARATUS WITH FAR INFRARED RADIATION

BACKGROUND OF THE INVENTION

1. Field of the Invention

This invention relates to an apparatus for sewage purifying treatment by improving the dissolving efficiency of oxygen. This is accomplished by jetting into sewage a pressurized water current and micronized bubbles made by the synergistic effect of the pressurized water current and air current which is introduced as it is spiralling from the outer circumferential part of the pressurized water current.

2. Description of Prior Art

Conventionally, drainage chiefly from households, dead leaves and other organic substance flow into enclosed water areas, such as culture ponds, reservoirs, scenic ponds provided at parks, golf courses, etc. or open water areas, such as rivers, ports and harbors. Such inflows stagnate, become rotten and emit offensive odors, causing malodor pollution to nearby residents. Moreover, water quality deteriorates because of substances which flow in and stagnates, with the resultant growth of water-bloom or the like. In the case of culture ponds, it is important to aim at purification of water quality so as to prevent fish disease, promote growth of cultured fish and improve quality of such fish. In the case of agricultural reservoirs, it has been ascertained that deterioration of water quality adversely affects growth of the crops.

The conventional method of purifying the water quality of culture ponds, scenic ponds, rivers, etc., is to use the jet type aeration system, an agitation system whereby an agitator is provided on the surface of a pond to agitate the surface of the water to bring both the water and air into contact and an air blowing system whereby air flows into the water so as to form micro-bubbles. All of these systems aim at improving of the dissolved oxygen content.

In the case of the conventional water agitating and aerating machine, however, a screw is arranged on the surface or below the surface of the water for supplying and mixing the air into the water. According to this conventional machine, it is possible to agitate and aerate the waste water on the surface part but it is difficult to agitate and aerate the waste which is below the surface or which is away from an agitator. Moreover, it is impossible for this machine to purify sludge sedimented on the bottom of a pond or the like. Thus, there is a limit in the range and ability of agitation and aeration for the conventional machine.

Since the conventional machine has a mechanically driven part which is to be set under the surface of the water or at the place which is subject to infiltration of the water, such driven part easily wears or mechanically fails due to impurities contained in the water. Thus, periodical inspection and maintenance are required.

It has been known that in the case of forming air taken in the water into bubbles, the more the bubbles are micronized, the more the dissolved oxygen content is improved. However, in the method of agitating the water and forming bubbles by revolution of a screw, there is a limit in the micronization of bubbles and increased power is required. In particular, a commercial power source equipment is required on the spot.

In the case of the air suction method, when the aeration is stopped impurities penetrate into the nozzle which is always under water due to water pressure and consequently the nozzle is clogged. Thus, repetition of aeration operations and stoppage can cause clogging of the nozzle and reduces the aeration effect.

In the case of stock farmers, the sewage purifying treatment apparatus of conventional type is too expensive and it is customary to store animal waste from livestock (pigs, cows, etc.) temporarily in sewage reservoirs dugout and then spread animal waste over a field or the like periodically. However, spreading of such unfermented animal waste is not suitable for growth of agricultural products and it is required to leave fields as they are until animal waste ferments to such an extent that it can be absorbed by plants in fields as fertilizer. Moreover, offensive odors emitted from sewage reservoirs and from spread waste cause the pollution problem.

SUMMARY OF THE INVENTION

In view of the above, the present invention provides a technique to improve the above-mentioned conventional sewage purifying facilities. For this purpose, the present invention provides an apparatus for sewage purifying treatment which does not require a mechanism driven part under water. Instead, the apparatus has a mechanism such that the air is sucked in and turned into a spiral air flow by utilizing high-speed water flow supplied in a cylindrical nozzle such that bubbles are micronized, whereupon air mixed water containing such micronized bubbles and sufficiently dissolved oxygen is discharged into the waste water for carrying out aeration effectively in a wide range.

In order to obtain the above object, the apparatus for sewage purifying treatment according to the present invention is characterized in that it is composed of a suction nozzle member which supplies pressurized water from its end portion, an intermediate nozzle member, an injection nozzle member (each of these members has a water passage within, is arranged on the same axial center, and is connected to each other), an air introducing nozzle formed between the nozzle members, an outer casing arranged in such a fashion that an air introducing chamber is formed at the outer circumferential part of the intermediate nozzle member (the air introducing chamber and the air introducing nozzle communicate with each other through the medium of an air introducing hole), a pressurized water supply pipe connected to an end of the suction nozzle member and an air supply pipe (for supplying the air to the air introducing chamber) connected to the outer casing.

In the apparatus for sewage purifying treatment mentioned above, the air is introduced by utilizing negative pressure which is generated in the cylindrical nozzle member by pressurized water flowing at high speed in the water passage and bubbles are micronized by the high-speed water flow. This process is repeated at plural stages and air-mixed water thus obtained is discharged into a waste water area. Therefore, according to the present invention, micronization of bubbles by high-speed water flow is provided and dissolved oxygen content is heightened. Aeration treatment can be extended to a distance in the waste water area and even raw sewage of livestock having higher viscosity than waste water can be treated.

A suction nozzle member, an intermediate nozzle member and an injection nozzle member are arranged on the same axial center and are connected to each other. These members have at the inner circumferential surface thereof a water passage and the inside diameters of the water passages are enlarged in order from the suction nozzle member at the upstream side to the intermediate nozzle member and the injection nozzle member at the downstream side. By this composition, negative pressure is generated at the downstream side of the nozzle members connecting position, the air can be introduced smoothly from an air introducing nozzle formed at the nozzle members connecting position and bubbles are micronized by high-speed water current flowing in the water passage and are mixed well with the water current.

A groove for micronizing coarse bubbles is formed at the downstream position from the air introducing nozzles (excepting the terminal air introducing nozzle). By this composition, coarse bubbles (not yet crushed) of the air introduced at the upstream side are easily micronized by turbulent flow generated by a groove formed in the direction intersecting the high-speed water flow at the inner circumferential surface of the water passage.

An air introducing nozzle of a ring slit-shape is formed between nozzle members. It is designed so that this air introducing nozzle communicates with the air introducing chamber through the medium of an air introducing hole made in tangential direction. By this composition, the air introduced in the water passage turns to spiral flow and is heightened in flow-speed. Accordingly, bubbles are further micronized by the synergistic effect of highly pressurized water flow and high speed spiral flow of the air.

A far infrared radioactive substance layer is provided at the inner surface of the air introducing chamber. The air introduced in the water passage is thus activated and is anionized. Therefore, highly pressurized water current including bubbles is also activated and is discharged into a waste water area, with the result of promotion of dissolution of organic matter in waste water.

DESCRIPTION OF THE DRAWING

For a better understanding of the invention as well as other objects and further features thereof, reference is made to the following description which is to be read in conjunction with the accompanying drawings herein:

FIG. 1 is a front view, in longitudinal section, showing an embodiment of the apparatus for sewage purifying treatment according to the present invention;

FIG. 2 is a cross section of the apparatus shown in FIG. 1, in which (A) is a cross section, taken on the A—A line, (B) is a cross section, taken on the B—B line and (C) is a cross section, taken on the C—C line.

DESCRIPTION OF THE INVENTION

Figure 3:
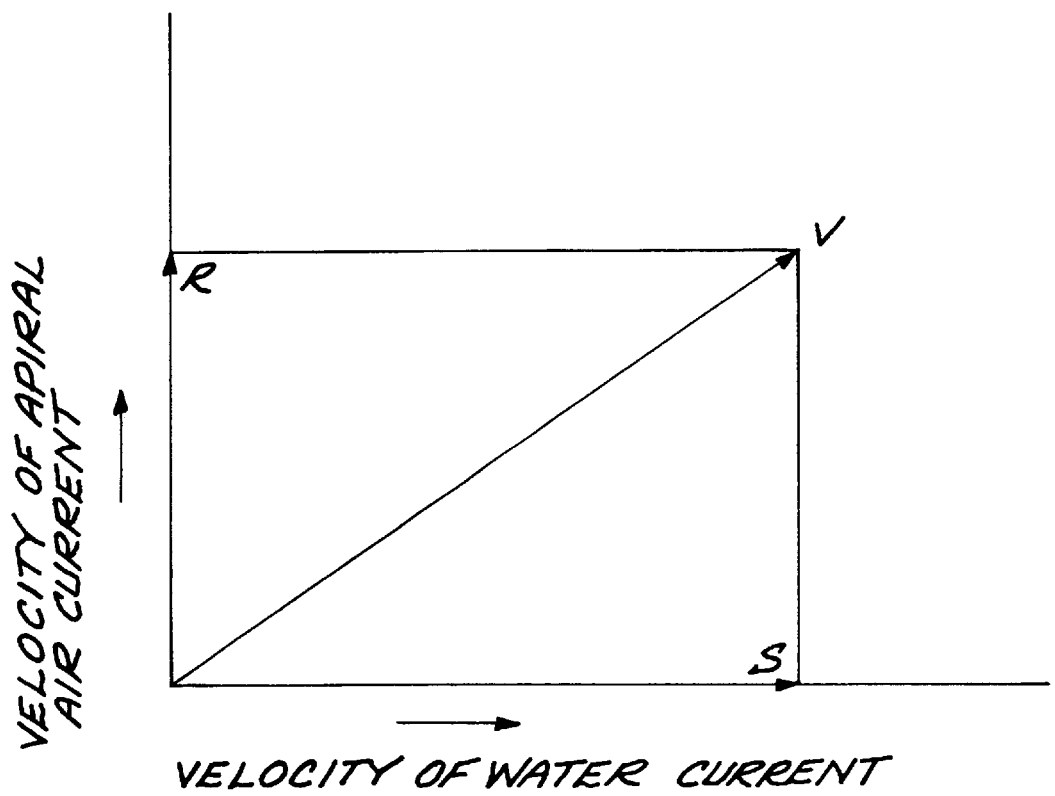
FIG. 3 is a graph showing the relation between the velocity of water current and the velocity of spiral air current in the apparatus for sewage purifying treatment according to the present invention.

An embodiment of the apparatus for sewage purifying treatment according to the present invention is described below, with reference to the accompanying drawings.

The apparatus 8 for sewage purifying treatment as shown in FIG. 1 is arranged at the position of the desired water level and at the spot where aeration treatment of sewage or the like is required in a water area, for example, an enclosed water area (such as a pond, a lake, a marsh or the like), an open water area (such as a river, a port, a harbor or the like) or in a sewage tank, a livestock sewage reservoir and the like.

This apparatus for sewage purifying treatment 8 is composed of a suction nozzle member 1, intermediate nozzle members 2, 3 (one, two or more stages of this member can be adopted but only two stages are shown in the drawing), an injection nozzle member 4 (these three kinds of members are arranged on a straight line on the same axial center and are connected to each other), a cylindrical outer casing 5 fixed on the outer circumferential part of the nozzle members, a pressurized water supply pipe P1 connected to an end portion of the suction nozzle member 1 and an air supply pipe P2 connected to the outer casing 5.

A pump or an underwater pump (not shown in the drawing) is connected to a top end of the pressurized water supply pipe P1 for supplying highly pressurized water into the suction nozzle member 1. A top end of the air supply pipe P2 is left open so that the air is free to enter into the air introducing chamber 51 in the outer casing 5 or is connected to a tank or a blower so that the pressurized air or a gaseous body such as oxygen can be supplied.

Pressurized water introduced from the end portion of the cylindrical suction nozzle member 1 via the pressurized water supply pipe P1 flows at high speed in the water passage of the suction nozzle member 1 and the air suctioned from air introducing nozzles 81, 82 of ring slip-shape formed between the suction nozzle member 1 and the intermediate member 2 and 3 is micronized by high-speed water current when it flows through the water passages of the intermediate nozzle members 2, 3 and is mixed with the pressurized high-speed water current.

For the purpose of improving dissolved oxygen content by making the air suctioned from the air introducing nozzles 81, 82 into micro bubbles effectively and mixing well with high-speed pressurized water current, one or more stages of the intermediate nozzle members (for example, the first intermediate nozzle member 2 and the second intermediate nozzle member 3) is/are provided and grooves are formed on the inner circumferential surface of the intermediate nozzle members 2, 3 at the downstream side from the air introducing nozzles 81, 82 in the direction intersecting the flow passage. When high-speed water current passes through the grooves, the air is micronized by virtue of spiralling current and high-speed water current and such micronized bubbles mix well with the pressurized high-speed water current when passing through the intermediate nozzle members, together with pressurized high-speed water current.

The high-speed water current which passed through the intermediate nozzle members and was mixed well with bubbles passes the trumpet shaped injection nozzle member 4, turns to stable streamline current and is injected at high speed into waste water or sewage.

An air introducing nozzle 83 of fine ring slit-shape is formed at the entrance position of the injection nozzle member 4. The air introduced from this air introducing nozzle 83 is partly crushed into micro-bubbles and partly remains between the inner circumferential surface of the injection nozzle member 4 and high-speed water current, acting as a lubricant and decreasing the flow resistance of the high speed fluid. Thus, air mixed water flows and is discharged at high speed.

The outer casing 5 is fitted to the outer circumferential parts of nozzle members 1, 2, 3, 4 connected in a body on the same axial center and one end portion of the outer circumferential part of the suction nozzle member 1 by bolting or the like. The other end portion of the outer casing 5 is screwed on the outer circumferential part of the injection nozzle member 4 and is fixed by bolting a flange 6 which is fixed by a set nut. Thus, an airtight air introducing chamber 51 is formed in the outer casing 5 and the air is introduced in the air introducing chamber 51 in the outer casing 5 from the air supply pipe P2 connected to the outer casing 5.

Three air introducing nozzles are shown in the drawing but the desired plurality of nozzles (two or more) may be provided according to the capacity of the apparatus for sewage purifying treatment. The air is introduced from the air introducing nozzle of the front stage in such a fashion that micro-bubbles are mixed in high-speed water flow and is introduced from the air introducing nozzle of the terminal stage in such a fashion that the air acts as a lubricant for reducing the pipe wall resistance of high-speed fluid.

Various members composing the apparatus for sewage purifying treatment according to the present invention are explained below in detail.

The suction nozzle member 1 is cylindrical and has a water passage 11 of the desired inside diameter and length, as shown in FIG. 1. The base end side of the suction nozzle member 1 is connected to a top end of the pressurized water supply pipe P1. A base end portion of the water passage 11 is trumpet-shaped and funnel-shaped so that pressurized water supplied from the pressurized water supply pipe P1 is introduced smoothly at high speed into the water passage 11 (whose inside diameter is smaller than that of the pressurized water supply pipe P1) of the suction nozzle member 1. A lumen, or cavity, is formed at the end surface of the exit of the suction nozzle member 1 and the end surface of the base end portion of the first intermediate nozzle member 2 is fitted to the lumen. An air introducing nozzle 81 of ring slit-shaped shape is formed between the suction nozzle member 1 and the first intermediate nozzle member 2.

The air introducing nozzle 81 is open to the water passage 11. A plurality of air introducing holes 91 are formed in a tangential direction to the inner circumferential part of the air introducing nozzle 81 of ring slit-shape. Thus, the air introduced from the air introducing chamber 51 turns into spiral current of air in the air introducing nozzle 81 and is introduced into the water passage 11 in the state of a spiral current of air.

The first intermediate nozzle member 2 to be connected to the suction nozzle member 1 is cylindrical in shape and has therewithin a water passage 21 (inside diameter b), similarly to the suction nozzle member 1 and the second intermediate nozzle member 3. One or more grooves 22 (U-shape, V-shape, rectangular shape or the like) is/are formed at the inner circumferential surface of the first intermediate nozzle member 2, in the direction intersecting the water passage 21. Thus, when water current passes through the water passage 21 at high speed, turbulence is generated by the groove 22 and this turbulence micronizes coarse bubbles in the spiral air flow introduced from the air introducing nozzle 81 at the upstream side. Therefore, as shown in the drawing, it is desirable to arrange the grooves near the air introducing nozzle 81 at the upstream side.

The diameter b of the water passage of the first intermediate nozzle member 2 should be a little larger than the diameter a of inflow passage at the upstream side so that when high-speed water current flows from the water passage of the suction nozzle member 1 to the water passage of the first intermediate nozzle member 2, negative pressure is generated at the inner circumferential surface of the water passage inlet part and the air is introduced from the air introducing nozzle 81 due to this negative pressure.

Similarly to the first intermediate nozzle member 2, the second intermediate nozzle member 3 is cylindrical in shape and is connected to the end portion of the first intermediate nozzle member 2. Formed within this second intermediate nozzle member 3 is a water passage 31 having the inside diameter c which is larger than the inside diameter b of the water passage 21. An air introducing nozzle 82 of ring slit-shape is formed at the position where the second intermediate nozzle member 3 is connected to the first intermediate nozzle member 2. The inner circumferential surface of the air introducing nozzle 82 is open to the water passage 31. A plurality of air introducing holes 92 are formed at the air introducing nozzle 82, as shown in FIG. 2(B). Thus, the air introducing chamber 51 communicates with the air introducing nozzle 82 and the air is introduced into the water passage 31 as spiral current.

Similarly to the first intermediate nozzle member 2, a groove 32 of ring-shape is formed at the inner circumferential surface of the water passage 31 so as to micronize coarse bubbles introduced into the water passage 31 from the air introducing nozzle 82 by high-speed turbulence which takes place at the groove 32 and to mix well micronized bubbles and water flow.

An injection nozzle member 4 having within a water passage 41 of the inside diameter d (which is larger than the inside diameter c of the water passage 31) is connected to the end portion of the second intermediate nozzle member 3. Formed at the position where the second intermediate nozzle member 3 and the injection nozzle member 4 are connected is an air introducing nozzle 83 of ring slit-shape which is open to the water passage 31 or the water passage 41. This air introducing nozzle 83 communicates with the air introducing chamber 51 through the medium of a plurality of air introducing holes 93 made in tangential direction. These air introducing holes 92, 93 are made at an initial end side and a terminal end side of the second intermediate nozzle member 3 respectively.

The slit width of these air introducing nozzles 91, 92 and 93 is so determined that the air to be introduced from these air introducing nozzles into the water passage may turn into micro-bubbles effectively by highly pressurized water current flowing at high-speed in the water passage.

The inside diameter c of the water passage of the second intermediate nozzle member 3 and the inside diameter d of the water passage of the injection nozzle member 4 can be the same but the relation of d=c is desirable to obtain air mixed water current effectively.

The relation among the inside diameters (a, b, c, d) of the water passages (11, 21, 31, 41) is expressed by the following formula $$b/a > c/b > d/c > 1.0$$

A far infrared radioactive substance layer 10 is formed at both the outer circumferential surface of the first and the second intermediate nozzle members 2, 3 and the inner circumferential surface of the outer casing 5.

The far infrared radioactive substance layer 10 is formed by applying infrared radioactive substance or by sticking infrared radioactive non-woven fabric. By forming the far infrared radioactive substance layer 10 at the inner surface of the air introducing chamber 51, when the air introduced into the air introducing chamber 51 from the air supply pipe P2 makes contact with the far infrared radioactive substance in said chamber, the air is activated by the action of far infrared radiation and is charged with anion. When such air is dissolved into high speed pressurized water current (flowing in the water passage through the air introducing nozzle) as micro-bubbles, such air dissolved water is also activated and anionized and then injected into sewage from the top end of the injection nozzle member 4.

The water thus activated promotes activation and growth of useful microbes (bacteria) in the water and consequently the decomposition ability of organic matter in the water and also decomposition of noxious substances (harmlessness) in the water are promoted.

The diameter of bubble which takes place by the relation between S (running speed of high speed pressurized water supplied from the pressurized water supply pipe P1) and the speed R of air current introduced from the air introducing nozzle is shown by the following formulae 2 and 3.

$$D = K\frac{1}{V} \qquad \text{Formula 2}$$

D: Average diameter
V: relative speed of water flow and air flow
K: Constant or function $$V = \sqrt{S^2 + R^2} > S \qquad \text{Formula 3}$$

(where S = The speed of flow which is not a spiral current)

From the above formulae, it can be seen that the average diameter of bubbles generated is theoretically in inverse proportion to the relative velocity V of water flow and air flow. Therefore, the higher the relative velocity V, the less the diameter of bubble D.

From the above, it can be said that even if the flow speed of pressurized water is constant, relative velocity V becomes high and the diameter D of bubble becomes small by turning the introduced air into a spiral flow, as shown in FIG. 3. The smaller the diameter D of bubble, the larger the dissolving efficiency.

The operation of the apparatus embodied above is explained below.

When the pressurized water is supplied to the apparatus 8 for sewage purifying treatment according to the present invention from the pressurized water supply pipe P1 connected between the top end of the suction nozzle member 1 and a pressurizing pump (not shown in the drawing), the pressurized water flows at high speed in the water passage 11 of the suction nozzle member 1 and when it is discharged into the water passage 21 (of a diameter which is somewhat larger than that of the water passage 11) of the first intermediate nozzle member 2, negative pressure is generated by the Venturi effect at the inner circumferential surface part of the water passage 21 (at the position where the suction nozzle member 1 and the first intermediate nozzle member 2 are connected). By this negative pressure, the air introduced into the air introducing chamber 51 from the air supply pipe P2 is further introduced into the air flow and is introduced into the water passage 21. As soon as the spiral air flow is introduced in the water passage 21, it is converted into micro-bubbles by high-speed pressurized water flowing down the water passage 11 and the water passage 21 and flows down as it is mixed with high-speed water flow.

Coarse bubbles (not yet converted) in the air introduced flow down along the inner circumferential surface of the water passage 21 and are crushed by pressure of running water which turned to turbulent flow at the groove 22 of ring-shape formed at the downstream position from the air introducing nozzle 81 and thus all bubbles introduced are micronized and flow down as they are mixed with high speed water current.

When pressurized water runs from the water passage 21 of the first intermediate member 2 to the water passage 31 of the second intermediate nozzle member 3, the air introduced into the air introducing nozzle 82 from the air introducing chamber 51 via the air introducing hole 92 and the air introducing nozzle 82 turns into spiral flow. As soon as the spiral flow is introduced into the water passage 31, it is crushed and micronized by high speed pressurized water flow running in the water passage 31 and is mixed with high speed water.

In the water passage 31 coarse bubbles (not yet converted) flow down along the inner circumferential surface of the water passage 31 but are crushed by pressure of water flow which turns into turbulence at the groove 32 of ring-shape formed at the downstream position from the air introducing nozzle 82 and thus all bubbles introduced are micronized.

When pressurized water runs from the water passage 31 of the second intermediate nozzle member 3 to the water passage 41 of the injection nozzle member 4, the air introduced from the air introducing chamber 51 via the air introducing nozzle 83 of ring slit-shape and is introduced into the water passage 41. The air introduced from the air introducing nozzle 83 is mixed with high-speed water flow as micro-bubbles. Such micro-bubbles flow in the water passage 41, together with high-speed water flow, along the inner circumferential surface of the water passage 41 and act as a lubricant, whereby the high-speed and is discharged into waste water at high speed as streamline water flow.

Thus, air mixed water current is discharged from the top end of the second intermediate nozzle member 3 into the injection nozzle member 4. By jetting energy of this pressurized water, high-pressure air mixed water is carried to the water area far away from the injection nozzle and aeration for a wide range of water area is made possible. In addition, such air mixed water flow can reach the bottom of a pond, the bottom of a river and the like, whereby it is made possible to supply dissolved oxygen to sludge accumulated on the bottom of a pond, the bottom of a river or the like and consequently aerobic treatment (dissolution) of such accumulated sludge can be promoted. Furthermore, by installing such apparatus in a livestock waste tank or a livestock waste pond (livestock waste has higher viscosity than waste water), highly pressurized water including micro-bubbles and dissolved oxygen can be injected into livestock waste and therefore microorganisms are activated and organic matter in livestock waste can be dissolved efficiently. Also, as aeration of stagnant part of water flow can be carried out, the water quality of ponds, lakes or marshes of wide area and of complicated configuration can be improved effectively.

According to the apparatus for sewage purifying treatment of the present invention, the air is introduced into pressurized water flowing at high speed in the waste passage by utilizing negative pressure generated in the cylindrical nozzle member by the pressurized water and bubbles are micronized by high-speed water flow. Such process is repeated in plural water passages and the air mixed water flow is discharged into a sewage water area. Therefore, high-degree micronization of bubbles is made possible and dissolved oxygen content is promoted. In addition, as high-speed air mixed water is strongly discharged into a waste water area by injection energy, aeration treatment can be extended to a distance in a water area and disposal of livestock waste having higher viscosity than waste water is possible.

As the inside diameters of water passages formed at the inner circumferential surface of the suction nozzle member, the intermediate nozzle member and the injection nozzle member (arranged and connected on the same axial center) are made larger by stages from the upstream side to the downstream side, negative pressure is generated at the downstream side of the nozzle members connecting position and introduction of the air from the air introducing nozzle formed at the nozzle members connecting position can be performed smoothly and bubbles are micronized by high-speed water flow running in the water passage and are mixed well with water flow.

Coarse bubbles (not yet converted into smaller bubbles) of the air introduced at the upstream side are also micronized easily by spiral flow of pressurized water generated at the groove formed at the inner circumferential surface of the water passage in the direction intersecting the flow of pressurized water.

Since the air introduced in the water passage turns into spiral flow and the speed of its running is heightened, bubbles are more micronized by synergistic effect of pressurized water flow and spiral air flow.

Since the air introduced in the water passage is activated and unionized, pressurized air flow containing bubbles is also activated and discharged into a water area. Thus, dissolution of organic matter contained in waste water is promoted.

While the embodiment has been described with reference to its preferred embodiments, it will be understood by those skilled in the art that various changes may be made and equivalents may be substituted for elements thereof without departing from the true spirit and scope of the invention. In addition, modifications may be made to adapt a particular situation or material to the teachings of the invention without departing from its essential teachings.

What is claimed is:

1. An apparatus for sewage purifying treatment comprising: a suction nozzle member for supplying pressurized water from its end portion, an intermediate nozzle member, an injection nozzle member, said nozzle members having a water passage within and being arranged on the same axial center, air introducing nozzles formed between nozzle members, an air introducing chamber formed at the outer circumferential part of said intermediate nozzle member, an outer casing, said air introducing chamber and said air introducing nozzles communicating with each other through the medium of an air introducing hole, a pressurized water supply pipe connecting to the end portion of said suction nozzle member and an air supply pipe for supplying the air to said air introducing chamber connected to said outer casing, and a far infrared radioactive substance layer formed at the inner surface of said air introducing chamber.

* * * * *